(12) United States Patent
Yano (10) Patent No.: US 7,488,091 B2
(45) Date of Patent: Feb. 10, 2009

(54) PROJECTOR

(75) Inventor: Youta Yano, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 220 days.

(21) Appl. No.: 11/099,464

(22) Filed: Apr. 6, 2005

(65) Prior Publication Data

US 2005/0219480 A1 Oct. 6, 2005

(30) Foreign Application Priority Data

Apr. 6, 2004 (JP) ............................. 2004-001866

(51) Int. Cl.
*G03B 21/00* (2006.01)
(52) U.S. Cl. .......................................... 362/284; 353/31
(58) Field of Classification Search .................... 353/61, 353/52, 119, 294, 31–37, 122
See application file for complete search history.

(56) References Cited

U.S. PATENT DOCUMENTS 6,874,892 B1 * 4/2005 McDaniel ..................... 353/84
7,086,737 B2 * 8/2006 Kitabayashi ................... 353/31
7,140,739 B2 * 11/2006 Ogawa et al. ................ 353/119

FOREIGN PATENT DOCUMENTS

| JP | 06-281906 | 10/1994 |
| JP | 2002-043768 | 2/2002 |
| JP | 2004-012827 | 1/2004 |

* cited by examiner

*Primary Examiner*—Anabel M Ton
(74) *Attorney, Agent, or Firm*—Crowell & Moring LLP (57) ABSTRACT

A lamp holder comprises: a resin cover member made of resin and having an open space portion at a place where the light from the lamp body is irradiated; and a cover plate which is made of metal and has a projection window of the cover plate for the light emitted from the lamp body to pass through, and which is fixed to the resin cover member for covering the open space portion of the resin cover member. According to this lamp holder, the cover plate made of metal is provided at a place of the lamp holder where out gas would be most likely to be produced if a resin material were used at such place, preventing a portion of the resin cover member from being provided at such place. This makes it possible to prevent out gas from being produced from the lamp holder.

8 Claims, 8 Drawing Sheets

PROJECTOR

BACKGROUND OF THE INVENTION

1. Field of the Invention

The present invention relates to a projector for projecting images onto a screen or the like.

2. Description of the Related Art

Conventionally, a projector is known in which, based on image data from a personal computer, a video camera and the like, images are formed by an image forming element, and the formed images are projected onto a screen or the like. This kind of image projector comprises a lamp unit for projecting light and an image projection unit for projecting the images formed by the image forming unit, using the light from the lamp unit.

The lamp unit has such structure that a lamp body is held in a lamp holder. The lamp unit is detachably mounted on a body of the projector so as to make it possible to replace the lamp body when the lamp body becomes unusable due to its degradation or reaching its life. Usually, a material such as resin is used for the lamp holder, but this may cause the following problem. While the lamp is on, the inside of the lamp holder is heated to a high temperature. Accordingly, if low heat-resistant resin is used for the material, there is a possibility that out gas is produced from the resin, and adheres to a color wheel, thereby drastically decreasing e.g. the brightness and contrast of light projected onto a screen. To solve this problem, a conventional lamp holder uses a high heat-resistant material such as LCP (Liquid Crystal Polyester). However, even using LCP to form a lamp holder, the out gas is produced to some extent. On the other hand, if an expensive LCP is used as a material for the lamp holder, the material cost of the lamp holder increases.

SUMMARY OF THE INVENTION

An object of the present invention is to provide a projector that can prevent production of out gas, and thereby prevent quality degradation of a color wheel attributed to the out gas, so that the product life can be prevented from becoming extremely short, and the material cost of a lamp holder can be reduced.

For achieving the above-described object, a projector according to the present invention comprises: a lamp unit comprising a lamp body for emitting light and a lamp holder for holding the lamp body; and an image projection unit which comprises a color wheel for coloring light, emitted from the lamp unit, with a predetermined color, and which is provided for projecting images using the light emitted from the lamp unit and passing through the color wheel.

The lamp holder comprises: a resin cover member being made of resin and having an open space portion at a place where the light emitted from the lamp body is irradiated; and a cover plate which is made of metal and has a projection window of the cover plate for the light emitted from the lamp body to pass through, and which is fixed to the resin cover member for covering the open space portion of the resin cover member.

According to the present invention, the resin cover member has an open space portion at a place where the light from the lamp body is irradiated, while a cover plate made of metal is fixed to the resin cover member for covering the open space portion of the resin cover member. The place where the light from the lamp body is irradiated is a place where out gas would be most likely to be produced if a resin material were used at such place or used for the entire lamp holder. However, as described above, an element or member made of resin is not provided at such place where the light from the lamp body is irradiated, and an element made of metal (cover plate) is provided instead, whereby out gas can be prevented from being produced from the lamp holder, thereby preventing quality degradation of the color wheel. Furthermore, the lamp holder having such structure enables the use of low heat-resistant material for the resin cover member, so that the material cost of the lamp holder can be reduced as compared with the case where LCP is used as a material for the lamp holder.

Preferably, the lamp holder further comprises: a cover glass for the light emitted from the lamp body to pass through when the light enters the image projection unit; and a holding plate being fixed to the cover plate and having a projection window of the holding plate, wherein the cover glass is sandwiched between a part of the holding plate around the projection window of the holding plate and a part of the cover plate around the projection window of the cover plate so as to be held at a predetermined position. This makes it possible to hold the cover glass securely without requiring complicated metal machining for the cover plate made of metal.

Further preferably, the cover plate is made of zinc-plated low carbon steel, more preferably SECC steel according to JIS (Japanese Industrial Standards).

In addition, it is possible that the lamp holder comprises: a front case member for covering front of the lamp body; a rear case member for covering bottom of the lamp body and a lower part of back of the lamp body; and an upper case member for covering top of the lamp body and an upper part of the back of the lamp body, wherein the front case member, the rear case member and the upper case member are connected to each other for holding the lamp body, and wherein the front case member is formed of the resin cover member, the cover plate, the holding plate and the cover glass.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 2A is a schematic perspective view of a lamp unit of the projector, while

FIG. 4A is a schematic perspective view of a resin cover member of the lamp unit, while

FIG. 5A is a schematic cross-sectional view along A-A line in FIG. 4A, while

FIG. 6A is a schematic perspective view of a cover plate of the lamp unit, while

FIG. 7A is a schematic perspective view of a holding plate of the lamp unit, while

DESCRIPTION OF THE PREFERRED EMBODIMENTS

The best modes and preferred embodiments of the present invention will be described hereinafter with reference to the annexed drawings. The specific embodiments described are not intended to cover the entire scope of the present invention, and hence the present invention is not limited to only the specific embodiments.

Figure 1:
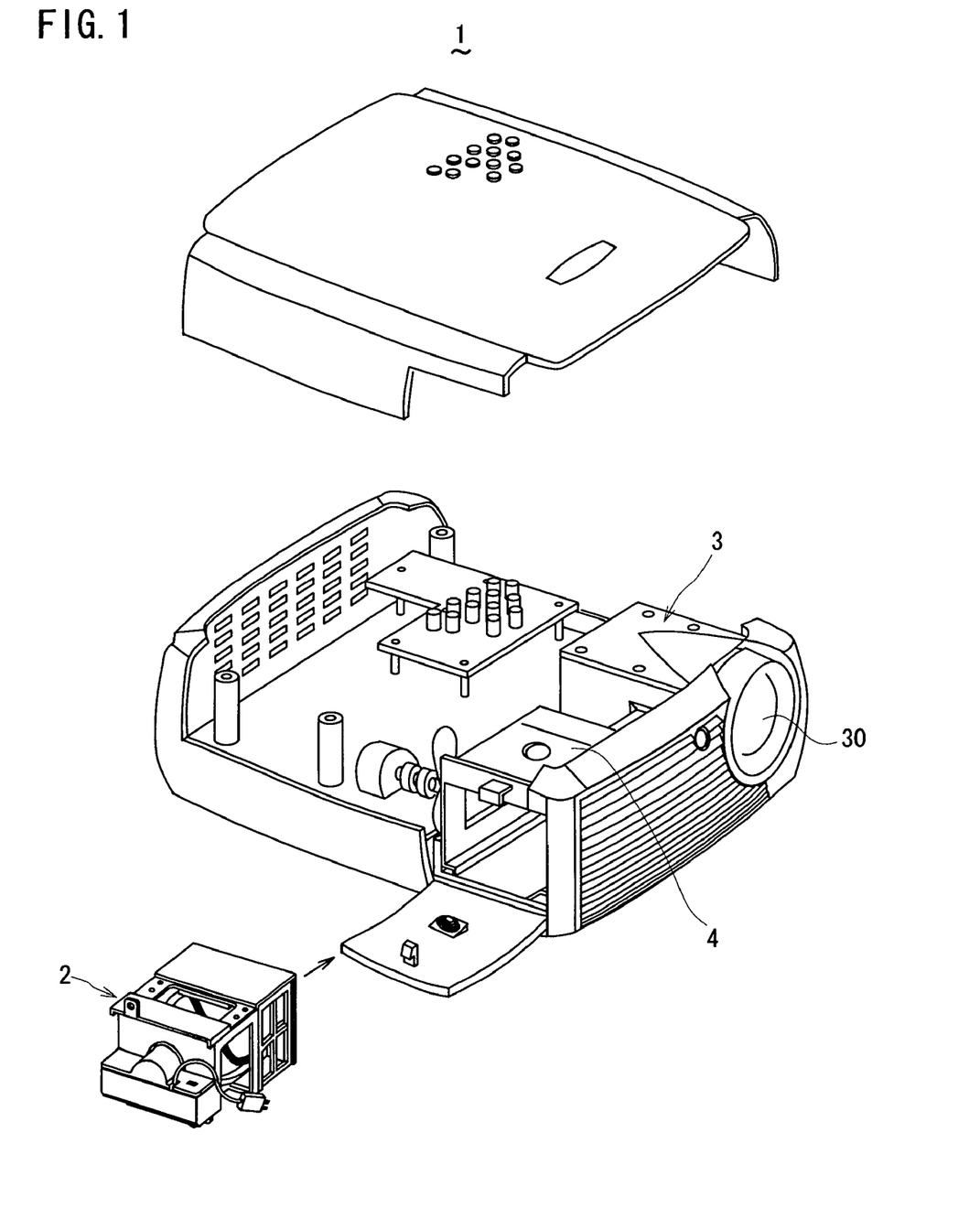
FIG. 1 is a schematic exploded perspective view of a projector according to an embodiment of the present invention.

FIG. 1 shows an exploded perspective view of a projector 1 according to an embodiment of the present invention. Referring to FIG. 1, a projector 1 is such a device that forms images by a built-in image forming element based on image signals input from a personal computer, a video camera and the like, and that projects the formed images onto a screen, a wall surface or the like for display. This image projector 1 comprises a projector lens 30 for projecting images forward, and further comprises built-in elements including a lamp unit 2 to project light for image projection, and an image projection unit 3 to project images, formed by the image forming element, from the projection lens 30 using the light from the lamp unit 2. The projector 1 has such a structure that can attach or detach the lamp unit 2 thereto or therefrom. The lamp unit 2 is inserted into a tubular lamp house 4 up to a position where the lamp unit 2 contacts the image projection unit 3 so as to be installed in the projector 1.

Figure 2A:
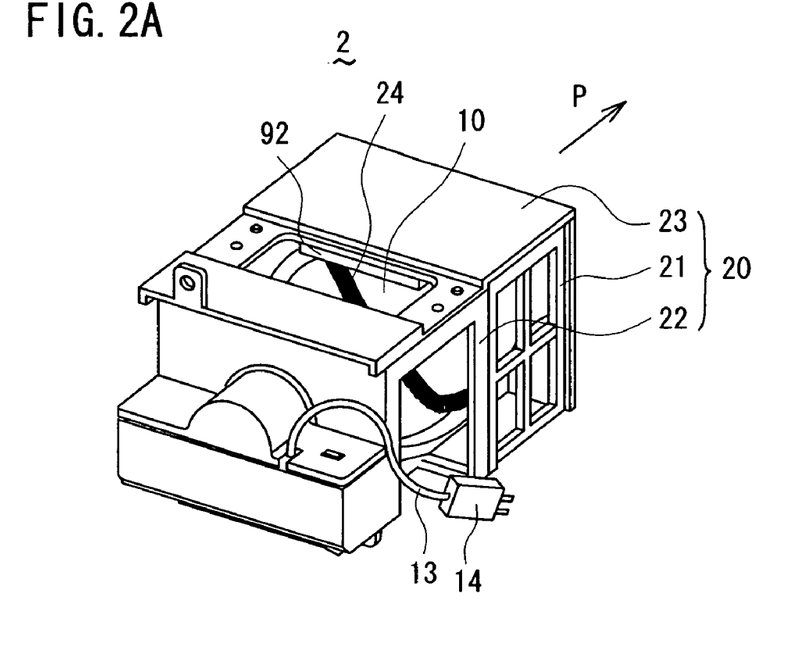
Figure 2B:
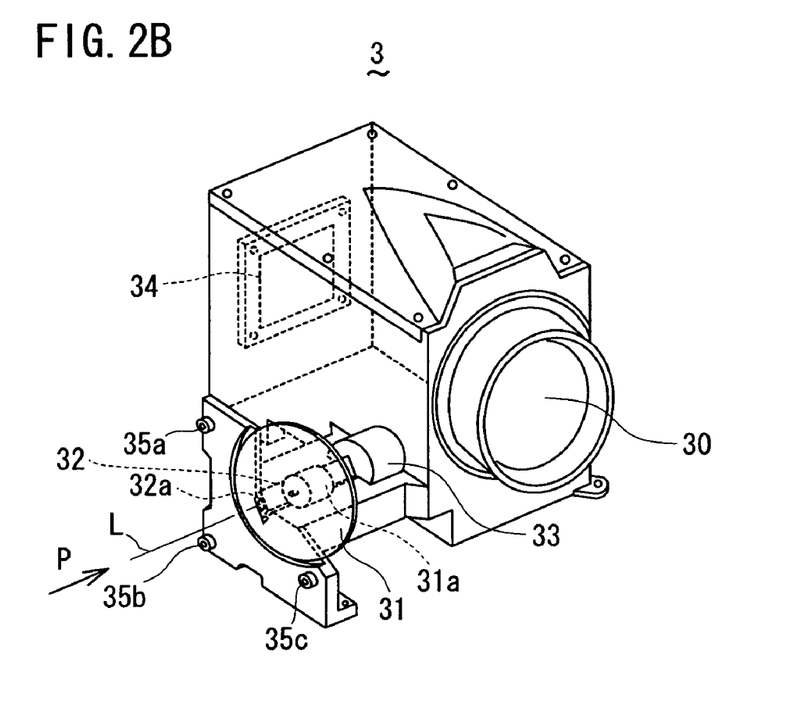
FIG. 2B is a schematic perspective view of an image projection unit of the projector.
Figure 3:
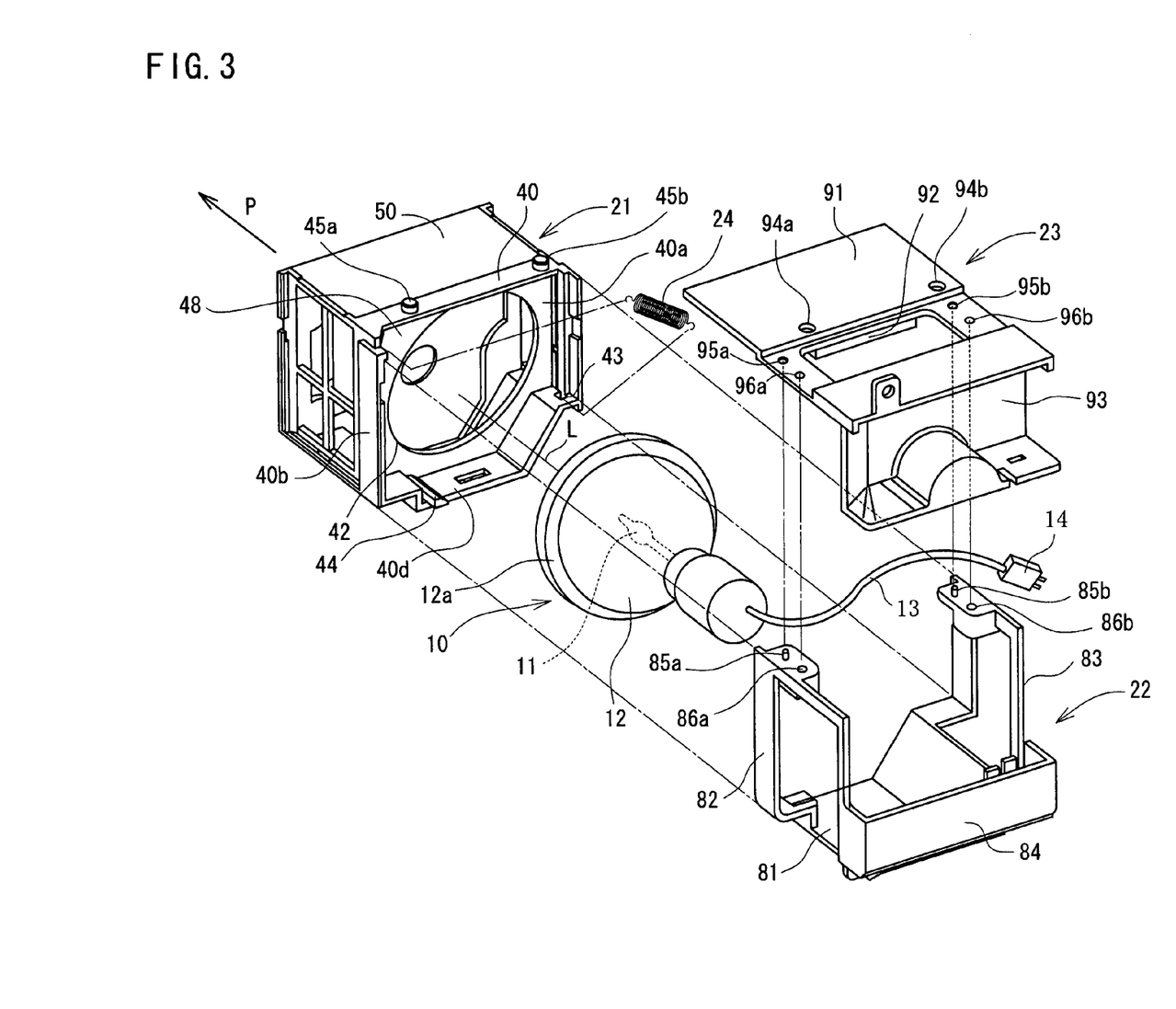
FIG. 3 is a schematic exploded perspective view of the lamp unit.

In the following, the lamp unit 2 and the image projection unit 3 will be described with reference to FIG. 2A to FIG. 3. FIG. 2A shows a perspective view of the lamp unit 2, while FIG. 2B shows a perspective view of the image projection unit 3. FIG. 3 shows an exploded perspective view of the lamp unit 2. Note that the projection direction of the lamp unit 2 is indicated by arrow P in these FIG. 2A to FIG. 3 as well as later described FIG. 4A to FIG. 7B, while the optical axis of the optical system of the lamp unit 2 is indicated by line L in FIG. 2B and FIG. 3.

Referring to FIG. 2A, the lamp unit 2 comprises a lamp body 10 and a lamp holder 20 for containing the lamp body 10. As shown in FIG. 3, the lamp body 10 comprises: a lamp bulb 11 to be supplied with electric power for emitting light; a reflector 12 for reflecting and collecting the light emitted from the lamp bulb 11; a cable 13 and a connector 14 for supplying electric power; and so on. The reflector 12 has an inner surface with a shape of concave surface that is open and faces toward the projection direction P. The reflector 12 has a circumferential flange 12a provided at a circumferential edge thereof at the light projection side. Further, the reflector 12 is made of glass from the viewpoint of heat resistance and efficiency of reflection. The lamp bulb 11 is fixed integrally to the reflector 12 in a manner that the light emitting portion of the lamp bulb 11 is positioned at substantially the center of the reflector 12.

The lamp holder 20 comprises a front case member 21, a rear case member 22 and an upper case member 23 that are connected to each other for holding the lamp body 10. The front case member 21 covers the front of the lamp body 10, and comprises a resin cover member 40, a cover plate 50 and so on as will be described later. The front case member 21 has a contact plate 48 having a contact surface 40a to contact the circumferential flange 12a of the lamp body 10, wherein the contact plate 48 is provided with a circular projection window 42 of the resin cover member 40. The projection window 42 of the resin cover member 40 has a diameter slightly smaller than that of the circumferential flange 12a. The front case member 21 has spring fixing openings 43 for fixing a coil spring 24. The coil spring 24 is fixed to the front case member 21 so as to be bridged on a rear surface of the reflector 12 of the lamp body 10 (refer to FIG. 2A). Using the elastic force of the coil spring 24, the lamp body 10 is fixed in a manner that the front surface of the circumferential flange 12a of the lamp body 10 is pressed to the contact surface 40a of the resin cover member 40, and that the side surface of the circumferential flange 12a is pressed to the inner surface of a side portion 40b and to a contact portion 44 of a bottom portion 40d of the cover member 40.

As shown in FIG. 3, the rear case member 22 covers the bottom of the lamp body 10 and a lower part of the back of the lamp body 10. The rear case member 22 comprises a bottom portion 81 together with side portions 82 and 83 and a rear portion 84 that are connected at their ends to the bottom portion 81. The upper case member 23 covers the top of the lamp body 10 and an upper part of the back of the lamp body 10. The upper case member 23 comprises a top plate 91 together with a rib 92 provided on and protruding from a lower surface of the top plate 91 and further with a rear portion 93 connected at its end to the top plate 91.

The lamp body 10 is fixed to the front case member 21 by the coil spring 24 with the reflector 12 being pressed to the contact surface 40a, the inner surface of the side portion 40b and the contact portion 44 of the front case member 21. The rear case member 22 is connected to the front case member 21, with the lamp body 10 being fixed to the front case member 21. The upper case member 23 is connected to the front case member 21 and the rear case member 22, with the rear case member 22 being connected to the front case member 21, in a manner that protruding portions 45a and 45b formed on the front case member 21 are engaged with engagement holes 94a and 94b of the upper case member 23, respectively, and that protruding portions 85a and 85b formed on the rear case member 22 are engaged with engagement holes 95a and 95b of the upper case member 23, respectively, and that screw holes 96a and 96b of the upper case member 23 are aligned with screw holes 86a and 86b of the rear case member 22, respectively, and further that the upper case member 23 and the rear case member 22 are screwed together. The rib 92 of the upper case member 23 and the contact surface 40a of the front case member 21 sandwich and hold the circumferential flange 12a of the reflector 12 therebetween, with the upper case member 23 being connected to the front case member 21 and the rear case member 22. Thus, the lamp body 10 is prevented from unexpectedly falling off the front case member 21.

Next, the image projection unit 3 will be described. Referring to FIG. 2B, the image projection unit 3 comprises: a color wheel 31; a light tunnel 32; a doublet lens 33; an image forming element 34; a projection lens 30; and so on. The color wheel 31 has red, blue and green color filters arranged in a circumferential direction, and is rotated by a motor 31a so as to time-sequentially color the light passing therethrough, whereby the color wheel 31 colors the light, emitted from the lamp unit 2, with a predetermined color. Thus, the image projection unit 3 projects images using the light passing through the color wheel 31. The color wheel is placed in front of a light entrance 32a of the light tunnel 32 so as to be rotatable. The light tunnel 32 is formed of four glass plates joined in a tubular form to homogenize and condense the light, entering the light entrance 32a, into a rectangular cross section, and emits the thus homogenized and condensed light from a light exit.

The doublet lens 33 is placed to be connected to the light exit of the light tunnel 32 to correct the light emitted from the light tunnel 32, correcting influences e.g. due to the wavelength of the light. The image forming element 34 forms images by reflecting the light which passes through the doublet lens 33, and is guided by e.g. a reflection mirror and a relay lens (that are now shown). The projection lens 30 projects the light reflected from the image forming element 34, namely projects the images formed by the image forming element 34.

Hereinafter, referring to FIG. 4A to FIG. 8, the front case member 21 will be described in detail. The front case member 21 comprises or is formed of: a resin cover member 40 made of resin; a cover plate 50 made of zinc-plated low carbon steel; a holding plate 60 made of metal; and a cover glass 70 (refer to FIG. 8) sandwiched and held between the cover plate 50 and the holding plate 60. The cover glass 70 is provided for the light emitted from the lamp body 10 to pass therethrough when the light enters the image projection unit 3. These resin cover member 40, the cover plate 50 and the holding plate 60 are fixed to each other, wherein the cover plate 50 and the holding plate 60 are further fixed to each other. The zinc-plated low carbon steel used here is an SECC steel according to JIS (Japanese Industrial Standards) G3313, wherein an SPCC-SD steel according to JIS G3141, which is a steel for general purpose, is used as a base for electroplating to make the SECC steel.

Figure 4A:
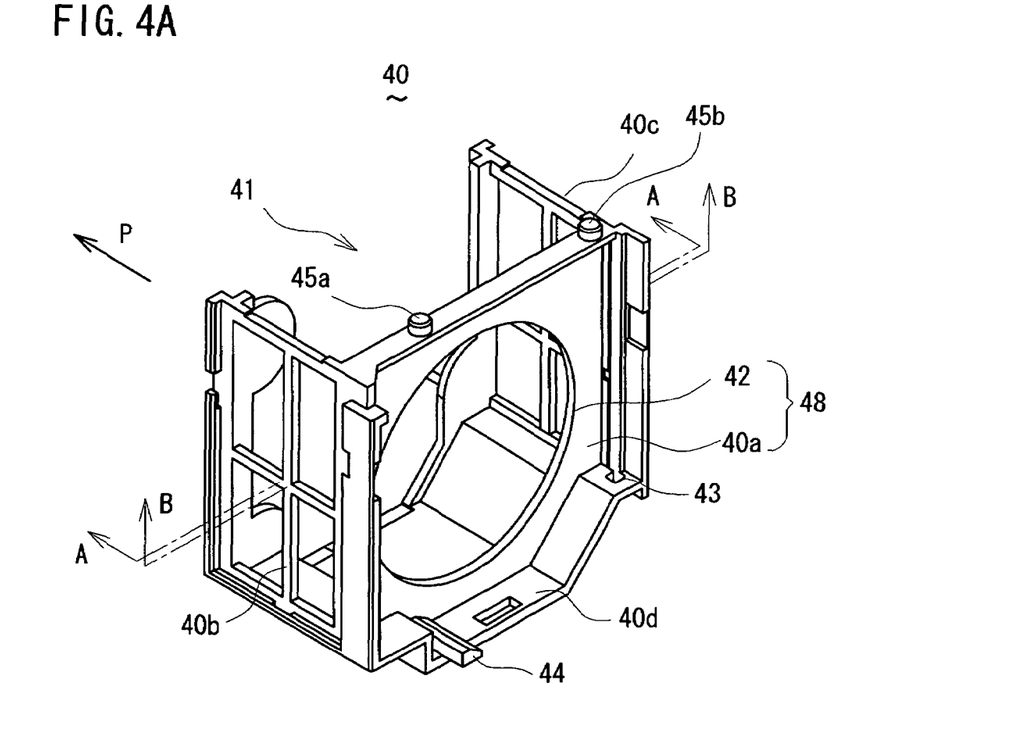
Figure 4B:
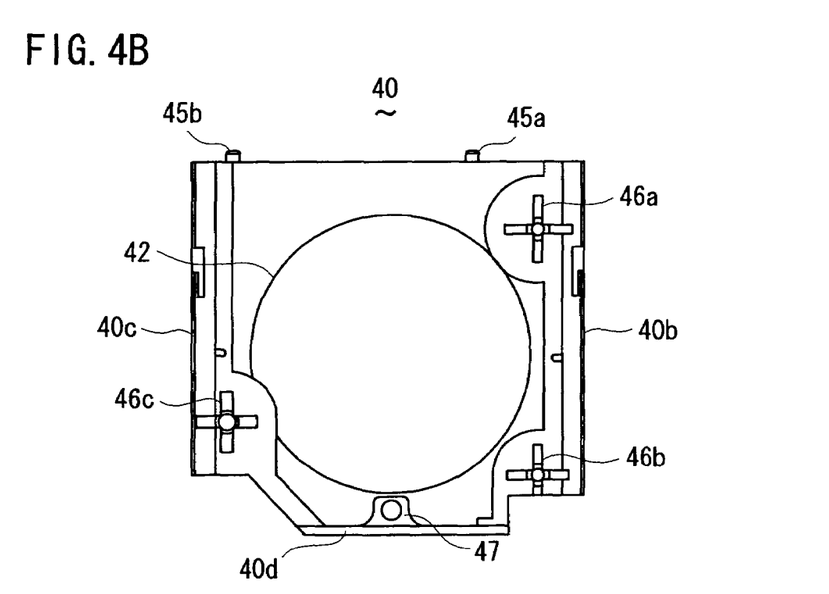
FIG. 4B is a schematic front view of the resin cover member.
Figure 5A:
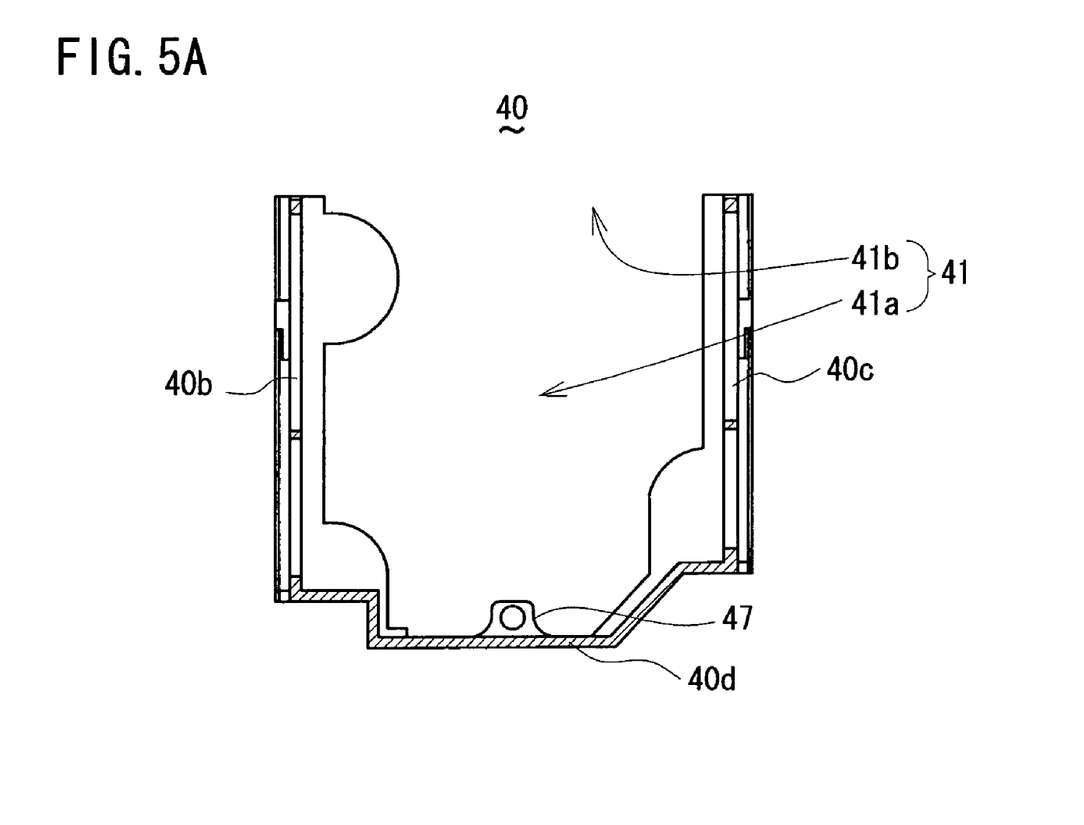
Figure 5B:
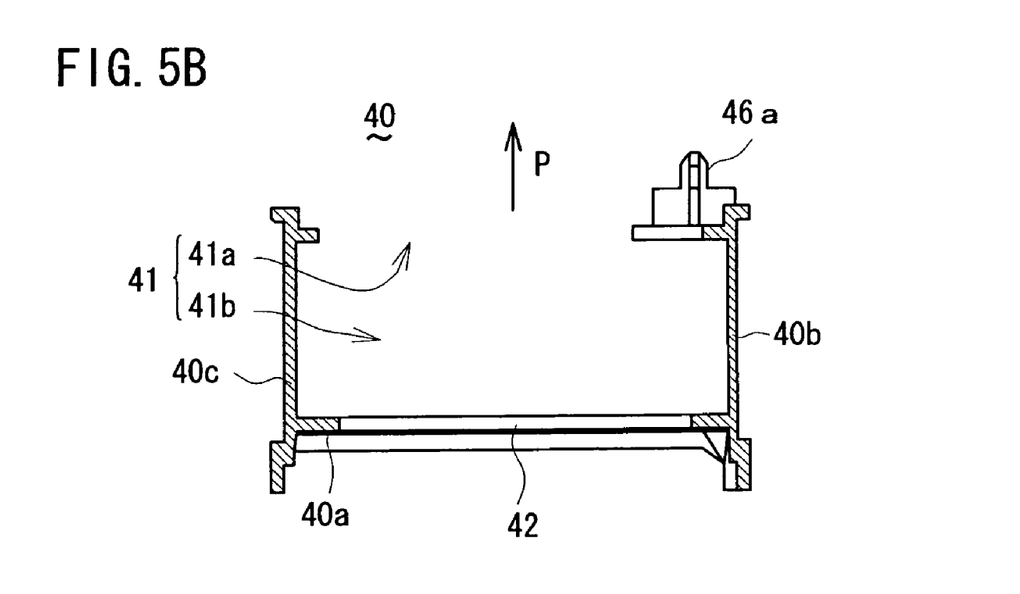
FIG. 5B is a schematic cross-sectional view along B-B line in FIG. 4A.

Referring to FIG. 4A, FIG. 4B, FIG. 5A and FIG. 5B, the resin cover member 40 will be described. FIG. 4A shows a perspective view of the resin cover member 40, while FIG. 4B shows a front view of the resin cover member 40. FIG. 5A shows a cross-sectional view along A-A line in FIG. 4A, while FIG. 5B shows a cross-sectional view along B-B line in FIG. 4A. The resin cover member 40 is composed of a contact surface 40a for the lamp body 10 to contact with, side portions 40b and 40c, a bottom portion 40d and so on, and has an open space portion 41 at a place to which the light from the lamp body 10 is irradiated, namely a place through which the light emitted from the lamp body 10 passes. As shown in FIGS. 5A and 5B, the open space portion 41 is open forward (in the direction P) and upward before a later described cover plate 50 is fixed to the resin cover member 40. More specifically, the open space portion 41 comprises a front open space portion 41a positioned forward of the lamp body 10 (in the direction of the emission of the light from the lamp body 10) and an upper open space portion 41b positioned upward of the front open space portion 41a, wherein the upper open space portion 41b corresponds in level to a space portion above the lamp body 10.

Since resin can be molded more easily than a metal even if the shape to be molded is complicated, the use of resin makes it possible to mold the resin cover member 40 adapted to the shape of the lamp body 10. Accordingly, the resin cover member 40 of the front case member 21 can fix the lamp body 10 securely in cooperation with the rear cover member 22 and the upper cover member 23. Note that the resin cover member 40 has positioning elements 46a to 46c each with a convex surface which engage with corresponding positioning elements 35a to 35c each with a concave surface, respectively, which are provided on the image projection unit 3 shown in FIG. 2B. This is for aligning the optical axis L of the optical system of the lamp holder 20 with that of the image projection unit 3.

Figure 6A:
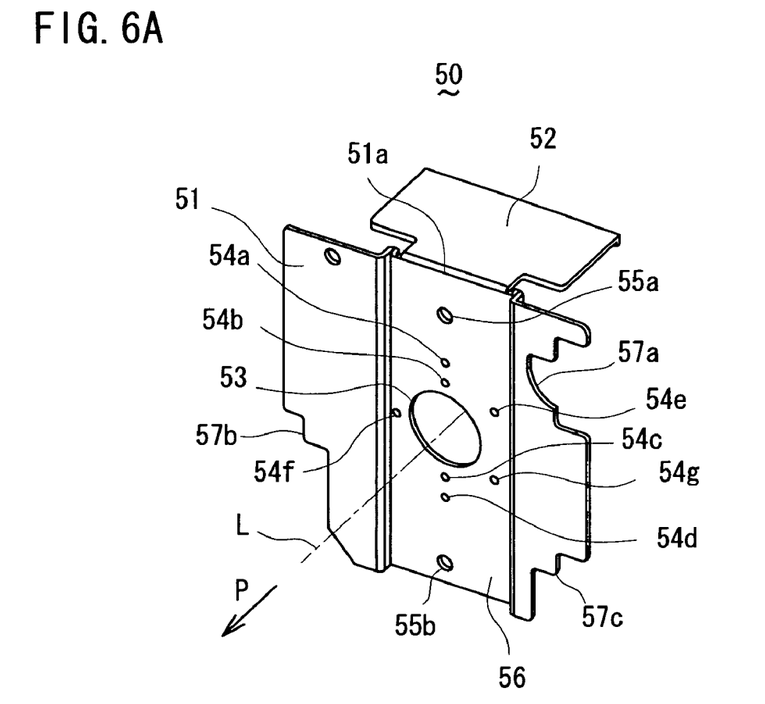
Figure 6B:
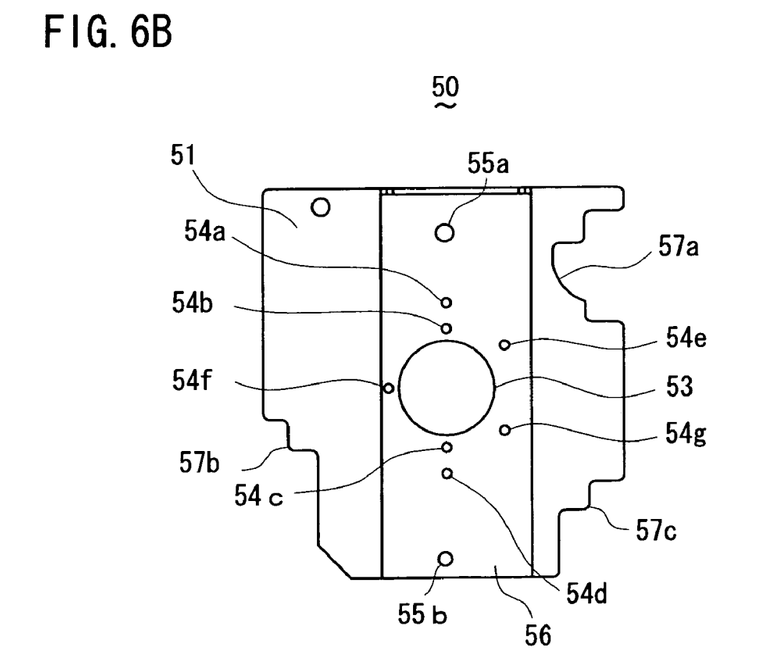
FIG. 6B is a schematic front view of the cover plate.

Next, referring to FIGS. 6A and 6B, the cover plate 50 will be described. FIG. 6A shows a perspective view of the cover plate 50, while FIG. 6B shows a front view of the cover plate 50. The cover plate 50 is made of SECC steel (zinc-plated low carbon steel), and comprises a front plate member 51 and an upper plate member 52. The SECC steel has excellent heat resistance and machinability, and is thus suitable as a material for the cover plate 50. The front plate member 51 is provided for covering the open space portion 41 from front, namely for covering the front open space portion 41a mainly, and has a recessed part 56 for fixing the holding plate 60 thereto, in which the recessed part 56 is formed at a central portion of the front plate member 51. The upper plate member 52 is provided for covering the open space portion 41 from above, namely for covering the upper open space portion 41b, and is connected to and extends from an upper end 51a of the front plate member 51. Thus, the cover plate 50 covers the open space portion 41.

The recessed part 56 of the cover plate 50 has a projection window 53 of the cover plate 50, and further has screw holes 55a and 55b as well as convex portions 54a to 54g formed of a plurality of convex protrusions. The projection window 53 of the cover plate 50, which is formed on the recessed part 56 of the front plate member 51 is a window for the light emitted from the lamp body 10 to pass through. The convex portions 54a to 54g are provided on the recessed portion 56 around the projection window 53 of the cover plate 50, and functions to position a cover glass 70 (refer to FIG. 8) mounted on the projection window 53 of the cover plate 50. Note that cutout portions 57a to 57c formed at peripheral portions of the front plate member 51 are provided at positions corresponding to those of positioning elements 46a to 46c, each with a convex surface, of the resin cover member 40.

As described above, the resin cover member 40 has the open space portion 41 at a position forward of the lamp body 10 (i.e. front open space portion 41a) to which the light from the lamp body 10 is irradiated most strongly, and further at a further position above the position forward of the lamp body 10 (i.e. front open space portion 41a). The upper open space portion 41b contacts high temperature air brought thereto by thermal convection. The cover plate 50 made of zinc-plated low carbon steel (SECC steel) is fixed to the resin cover member 40 for covering the open space portion 41. This means that the zinc-plated low carbon steel (SECC steel) is provided at a place where out gas would be most likely to be produced if a resin material were used at such place, preventing an element or member made of resin from being provided at such place, namely preventing a portion of the resin cover member 40 from being placed at such place. This makes it possible to prevent out gas from being produced from the lamp holder 2, and thereby to prevent quality degradation of the color wheel 31. Thus, the product life of the lamp unit 2 can become longer. Furthermore, the use of zinc-plated low carbon steel (SECC steel) enables the use of low heat-resistant material for the resin cover member 40, so that the material cost for making a lamp holder can be reduced as compared with e.g. LCP (Liquid Crystal Polyester).

Figure 7A:
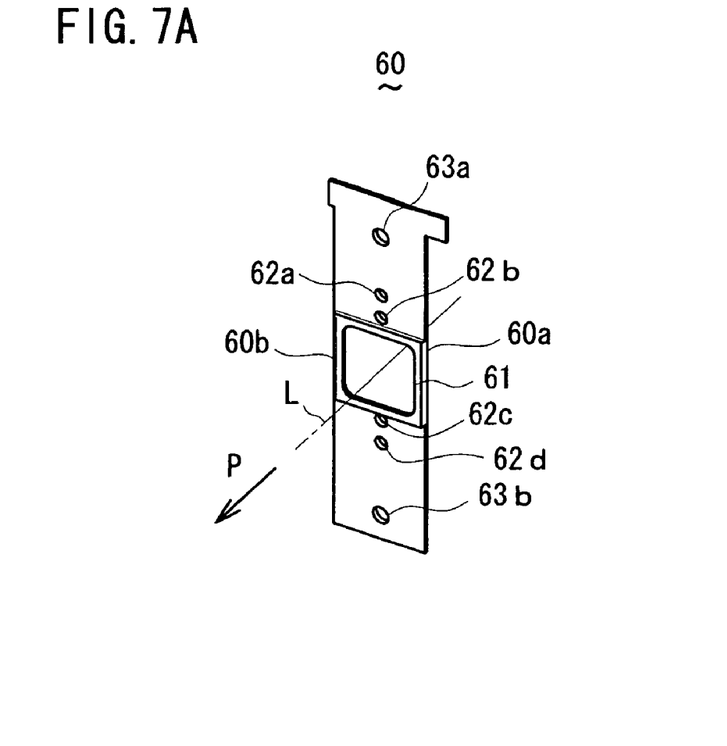
Figure 7B:
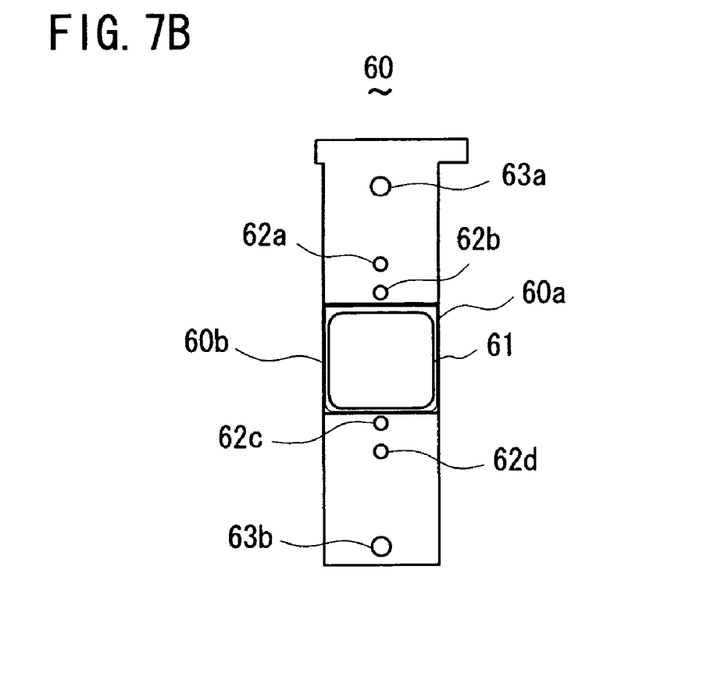
FIG. 7B is a schematic front view of the holding plate.

Next, referring to FIGS. 7A and 7B, the holding plate 60 will be described. FIG. 7A shows a perspective view of the holding plate 60, while FIG. 7B shows a front view of the holding plate 60. The holding plate 60 is made of metal, and has a projection window 61 of the holding plate 60 and engagement holes 62a to 62d provided therein at positions corresponding to the convex portions 54a to 54d so as to engage with the convex portions 54a to 54d, respectively. The holding plate 60 and the cover plate 50 sandwich and hold the cover glass 70 therebetween at a predetermined position.

If an attempt is made, using one metal plate, to form a holding structure for securely holding the cover glass 70 under the assumption that metal is to be used for a part of the lamp holder 20, it becomes necessary to machine the metal into a complicated shape, causing the process (machining) to be more difficult than the process in which the lamp holder 20 is molded using resin alone. However, according to the present embodiment, the holding plate 60 for holding the cover glass 70 is used in addition to the cover plate 50, so that the cover glass 70 is sandwiched and held between the holding plate 60 and the cover plate 50. Thus, the cover glass 70 can be held securely without requiring complicated metal machining. Besides, the cover glass 70 can be accurately positioned since the cover plate 50 has provided thereon convex portions 54a to 54d for positioning the cover glass 70, while the holding plate 60 has engagement holes 62a to 62d to engage with the convex portions 54a to 54d of the cover plate 50, respectively.

Figure 8:
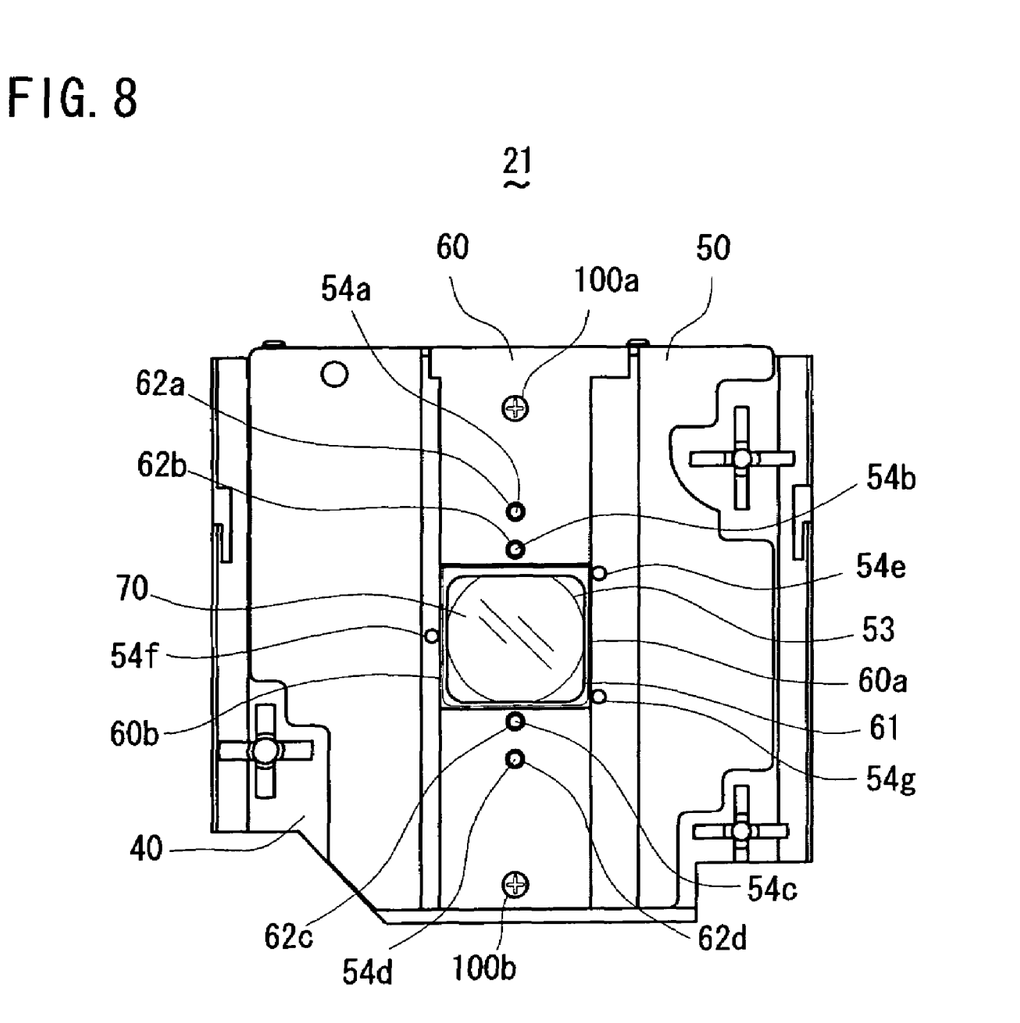
FIG. 8 is a schematic front view of an assembled front case member of the lamp unit.

These resin cover member 40, cover plate 50 and holding plate 60 are assembled by the following procedure. First, the cover plate 50 is fixed to the resin cover member 40 for covering the open space portion 41 of the resin cover member 40. Thereafter, the holding plate 60 is fixed to the cover plate 50 as shown in FIG. 8. FIG. 8 shows a front view of the assembled front case member 21. Referring to FIG. 8, the holding plate 60 is fixed to the cover plate 50 in a manner: that the cover glass 70 is sandwiched between a part of the holding plate 60 around the projection window 61 of the holding plate 60 and a part of the cover plate 50 around the projection window 53 of the cover plate 50 so as to be held at a predetermined position; that the engagement holes 62a to 62d are engaged with the convex portions 54a to 54d of the cover plate 50; and that side 60a and side 60b of the holding plate 60 are fitted to and positioned by the convex portions 54e and 54g and the convex portion 54f of the cover plate 50.

With the holding plate 60 being fixed to the cover plate 50 in this manner, the resin cover member 40, the cover plate 50 and the holding plate 60 are fixed to each other by inserting a screw 100b into a screw hole 47 (refer to FIG. 4B) provided in the resin cover member 40, a screw hole 55b (refer to FIGS. 6A and 6B) provided in the cover plate 50 and a screw 63b (refer to FIGS. 7A and 7B) provided in the holding plate 60, while the cover plate 50 and the holding plate 60 are fixed to each other by inserting a screw 100a into a screw hole 55a (refer to FIGS. 6A and 6B) provided in the cover plate 50 and a screw hole 63a (refer to FIGS. 7A and 7B) provided in the holding plate 60, whereby the front case member 21 is assembled. Thus, the front case member 21 is formed of or comprises the resin cover member 40, the cover plate 50, the holding plate 60 and the cover glass 70.

It is to be noted here that the present invention is not limited to such specific embodiments as described above, and various modifications are possible. For example, the material of the cover plate 50 can be metal other than the SECC steel. Furthermore, the shapes of the resin cover member 40 and the cover plate 50 can be other than those described above as long as the resin cover member has an open space portion at a place where out gas would be most likely to be produced if a resin material were used at such place, and a cover plate can be fixed to the resin cover member for covering the open space portion. In addition, the shape of the holding plate can be any shape as long as the cover glass can be securely held by being sandwiched between the holding plate and the cover plate.

This application is based on Japanese patent application 2004-1866 filed Apr. 6, 2004, the contents of which are hereby incorporated by reference.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A projector comprising:
   a lamp unit comprising a lamp body for emitting light and a lamp holder for holding the lamp body; and
   an image projection unit which comprises a color wheel for coloring light, emitted from the lamp unit, with a predetermined color, and which is provided for projecting images using the light emitted from the lamp unit and passing through the color wheel,
   wherein the lamp holder comprises:
   a resin cover member being made of resin and having an open space portion at a place where the light emitted from the lamp body is irradiated sufficiently strongly to produce out-gassing from the resin cover member of the lamp holder;
   a cover plate which is made of metal and has a projection window of the cover plate for the light emitted from the lamp body to pass through, and which is fixed to the resin cover member for covering the open space portion of the resin cover member irradiated sufficiently strongly by the lamp, thus preventing the out-gassing;
   a cover glass for the light emitted from the lamp body to pass through when the light enters the image projection unit; and
   a holding plate being fixed to the cover plate and having a projection window of the holding plate,
   wherein the cover glass is sandwiched between a part of the holding plate around the projection window of the holding plate and a part of the cover plate around the projection window of the cover plate so as to be held at a predetermined position, and wherein the cover plate is made of zinc-plated low carbon steel.

2. The projector according to claim 1, wherein the zinc-plated low carbon steel is SECC steel according to JIS (Japanese Industrial Standards).

3. The projector according to claim 2, wherein the lamp holder comprises: a front case member for covering front of the lamp body; a rear case member for covering bottom of the lamp body and a lower part of back of the lamp body; and an upper case member for covering top of the lamp body and an upper part of the back of the lamp body,
   wherein the front case member, the rear case member and the upper case member are connected to each other for holding the lamp body, and
   wherein the front case member is formed of the resin cover member, the cover plate, the holding plate and the cover glass.

4. The projector according to claim 1, wherein the lamp holder comprises: a front case member for covering front of the lamp body; a rear case member for covering bottom of the lamp body and a lower part of back of the lamp body; and an upper case member for covering top of the lamp body and an upper part of the back of the lamp body,
   wherein the front case member, the rear case member and the upper case member are connected to each other for holding the lamp body, and
   wherein the front case member is formed of the resin cover member, the cover plate, the holding plate and the cover glass.

5. A projector comprising:
   a lamp unit comprising a lamp body for emitting light and a lamp holder for holding the lamp body; and
   an image projection unit which comprises a color wheel for coloring light, emitted from the lamp unit, with a predetermined color, and which is provided for projecting images using the light emitted from the lamp unit and passing through the color wheel, wherein the lamp holder comprises:

a resin cover member being made of resin and having an open space portion at a place where the light emitted from the lamp body is irradiated sufficiently strongly to produce out-gassing from the resin cover member of the lamp holder; and a cover plate which is made of metal and has a projection window of the cover plate for the light emitted from the lamp body to pass through, and which is fixed to the resin cover member for covering the open space portion of the resin cover member irradiated sufficiently strongly by the lamp, thus preventing the out-gassing, wherein the cover plate is made of zinc-plated low carbon steel.

6. The projector according to claim 5, wherein the zinc-plated low carbon steel is SECC steel according to JIS (Japanese Industrial Standards).

7. The projector according to claim 6, wherein the lamp holder comprises: a front case member for covering front of the lamp body; a rear case member for covering bottom of the lamp body and a lower part of back of the lamp body; and an upper case member for covering top of the lamp body and an upper part of the back of the lamp body, wherein the front case member, the rear case member and the upper case member are connected to each other for holding the lamp body, and wherein the front case member is formed of the resin cover member, the cover plate, the holding plate and the cover glass.

8. The projector according to claim 5, wherein the lamp holder comprises: a front case member for covering front of the lamp body; a rear case member for covering bottom of the lamp body and a lower part of back of the lamp body; and an upper case member for covering top of the lamp body and an upper part of the back of the lamp body, wherein the front case member, the rear case member and the upper case member are connected to each other for holding the lamp body, and wherein the front case member is formed of the resin cover member, the cover plate, the holding plate and the cover glass.

* * * * *